C. H. AMANN,
Assignor of one-half his right to L. A. Harker.
PIPE-ELBOW MACHINES.
No. 7,874. Reissued Sept. 4, 1877.
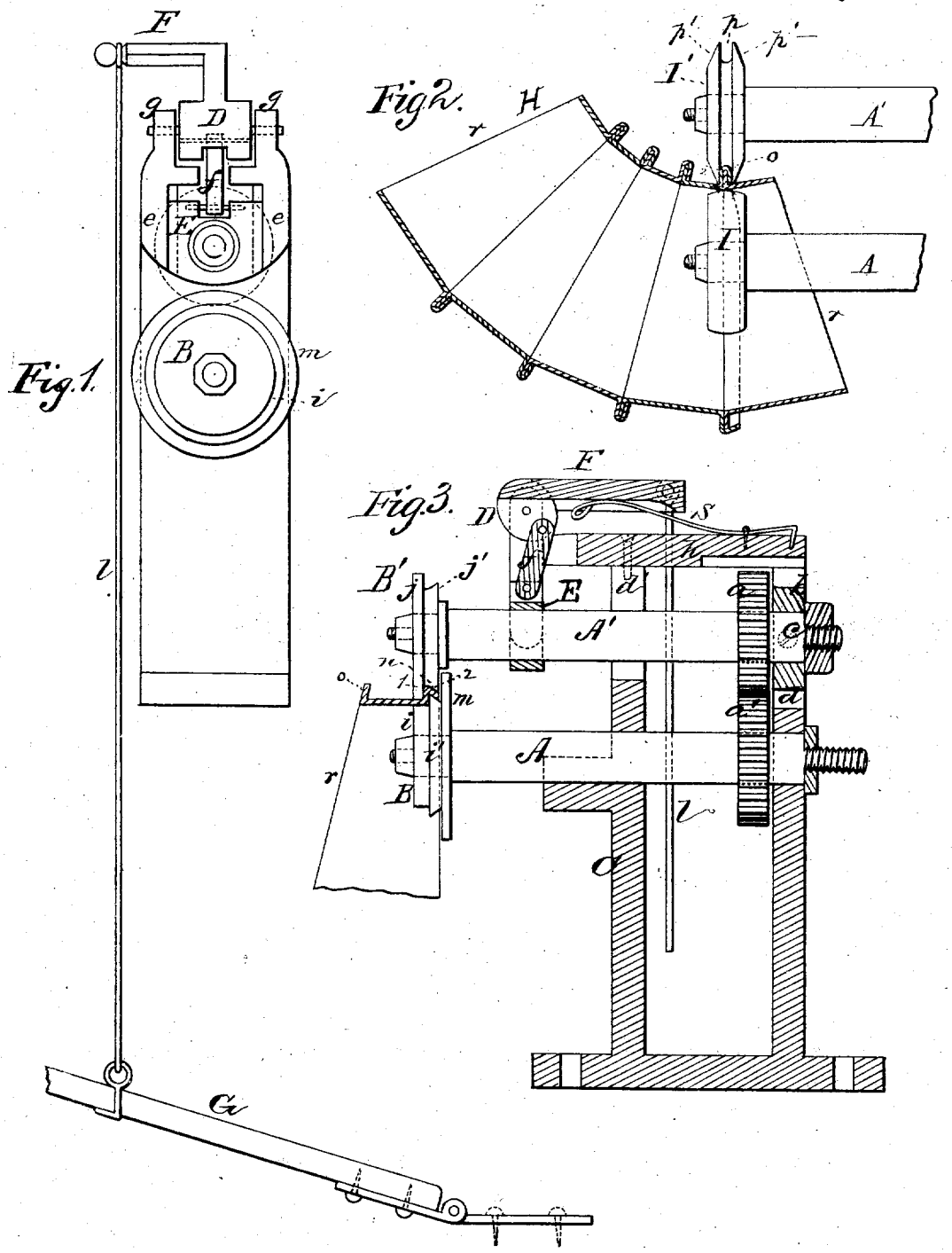
WITNESSES
Villette Anderson
F. J. Masi
INVENTOR
Charles Henry Amann
by E. W. Anderson,
ATTORNEY

UNITED STATES PATENT OFFICE.

CHARLES H. AMANN, OF COLUMBUS, OHIO, ASSIGNOR OF ONE-HALF HIS RIGHT TO LEWIS A. HARKER, OF SAME PLACE.

IMPROVEMENT IN PIPE-ELBOW MACHINES.

Specification forming part of Letters Patent No. 178,705, dated June 13, 1876; Reissue No. 7,874, dated September 4, 1877; application filed May 19, 1877.

*To all whom it may concern:*

Be it known that I, CHARLES H. AMANN, of Columbus, in the county of Franklin and State of Ohio, have invented certain new and useful Improvements in Pipe-Elbow Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 of the drawings is a representation of an end view of my improved pipe-jointing machine. Fig. 2 is a detail view of a part of the same, and Fig. 3 is a longitudinal vertical section of the same.

This invention relates to improvements in machines for the manufacture of pipe-elbows of curved form.

It consists in the combination of an anvil cone-wheel, composed of two parts of different diameters, the outer and smaller part being right cylindrical, and the inner and larger part in the form of a conical frustum, and of a similar pressure or hammer wheel, the outer and larger part of which is right cylindrical, and the inner and smaller part a conical frustum, the said wheels being applied upon rotating shafts, the one above the other, with their rectilinear and beveled surfaces in contact, whereby a section of pipe passed in between these wheels will have a bead formed on its edge adapted to receive a lip upon a second section.

It also consists in a disk or stop, rotating with the anvil cone-wheel and extending beyond the beveled periphery of the anvil or pressure-wheel, whereby means are provided for forming the bead equidistant at all points from the edge of the pipe-section.

It also consists in making the hammer-wheel adjustable, and in combining with it a pressure toggle-link and operating-lever therefor, and an actuating-treadle, whereby the necessary pressure for forming the bead is obtained.

It also consists in combining, with a wheel having a slightly-rounded periphery, a pressure-wheel having a deep peripheral groove, whereby means are provided for rapidly uniting the sections of pipe, as will be hereinafter more fully set forth.

In the annexed drawings, the letter A designates the shaft of the anvil-wheel B, and A′ that of the hammer-wheel B′, arranged the one above the other, and actuated to rotate in opposite directions or contrary directions through the medium of intermeshing gears *a* *a′* and a suitable crank-arm or a pulley-wheel.

Shaft A is arranged in fixed bearings in a frame, C, in the customary manner, while shaft A′ is adjustable and vertically vibratory in the following manner, to wit: One of its ends is mounted loosely in a bearing-block, *b*, confined by means of a screw or screws, *c*, in a slot, *d*, formed in one of the uprights of the frame, and it extends through a slot, *d′*, in the upper end of the other upright, its free end being suspended in a vertically-movable sash, E, arranged in guides *e e′* upon an overhanging arm, *h*, of the frame, from an operating angle-lever, D, by means of a connecting rod or link, *f*, pivoted both to the sash and to the cam, as shown in Fig. 3. In this manner space is given under the overhanging arm and sash for the introduction of the work.

Angle-lever D is mounted in suitable bearings *g* upon the arm or cross-piece *h*, and is provided with the arm F of the lever D, connected by means of a rod, *l*, to a treadle, G. When this treadle is depressed the sash will be lowered and the hammer-wheel B′ forced into close contact with the anvil-wheel B. If the treadle be released from pressure, wheel B′ will be raised up from wheel B by the recoil of a suitable spring, S, arranged between lever-arm F and cross-piece *h*, said spring having been compressed or actuated by the operation of the treadle.

Wheels B B′ are removably applied upon their respective shafts, and are of the following construction: Wheel B is composed of two parts, *i* *i′*, of different diameters, the latter being the greater. Part *i* is right cylindrical, its periphery being parallel to the axis of shaft A, and part *i′*, the larger, is in the form of a conical frustum, its base or larger diameter being next to part *i*, and its beveled periphery forming an acute angle with the shaft. Wheel B′ is likewise composed of two parts, *j j′*, of different diameters, the larger, *j*, being right cylindrical, and the smaller a conical frustum, arranged the former outside and the latter inside, so that the right cylindrical parts will be in the same plane, and also the beveled parts, the one with the other. The wheels will be of any suitable metal, and the anvil will be provided with a gage or stop, *m*, of greater diameter than wheel A, and, preferably, cast with and forming a component part thereof.

The operation of my machine is as follows: The edge of the pipe-section is passed between wheels B B′, and pressed against stop *m*. The treadle is then operated, bringing the latter down forcibly upon the former, and bending or swaging the edge of the pipe into the form of a bead, *n*, one of the edges, 1, of which will be at right angles to the axis of the pipe, and the other, 2, at an acute angle to the wall 1. The wheels B B′ being set in motion, this bead will be formed all around the edge of the section. A flange, like *o*, will then be formed, by an ordinary tinner's turning-machine, around the edge of a second section, and will be passed under flange 2 of bead *n* into the latter. Wheels B B′ will then be removed, and a wheel, I, having a slightly-rounded periphery, substituted for the former, and a wheel, I′, having a deep peripheral groove, *p*, and externally beveled edges *p′* for the latter. The united sections will be then passed between wheels I I′, and the latter brought down through the medium of a treadle and its connections upon the former, when flange 2 of bead *n* will be bent down and over flange *o*, and, by imparting rotary motion to the said wheels, the two sections will be clamped closely together. These sections being short, and having tapering edges *r*, a symmetrically-rounded elbow, H, may be made by the jointing of successive sections together, admirably adapted for stove-pipes, hot-air conduits for furnaces, and for other analogous purposes.

I am aware that a shallow grooved wheel for swaging sheet-metal has been used in connection with a rounded anvil-wheel, and I do not claim such invention, my clamping-wheel having a deep groove capable of receiving and pressing together the raised flanges of a sheet-metal seam, which cannot be done with a shallow groove.

What I claim as new, and desire to secure by Letters Patent, is—

1. The anvil-wheel B, consisting of an exterior right-cylindrical part, *i*, and an inner part, *i′*, of the form of a conical frustum, with its larger base next the part *i*, and of larger diameter than the same, in combination with the hammer wheel B′, consisting of an outer right-cylindrical part, *j*, and an inner conical part, *j′*, of less diameter, and forming a re-entrant angle with part *j*, substantially as specified.

2. In a pipe-jointing machine, the combination, with the shafts A A′ and wheel B′, having the exterior right-cylindrical portion *j*, the conical portion *j′*, and the re-entering angle between, of the anvil-wheel B, having the exterior cylinder *i*, the salient *i′*, and the stop-flange *m*, arranged in contact with the inner face of the wheel B′, and adapted to form a bead on a pipe-edge with an oblique flange, 2, substantially as specified.

3. The combination, with an anvil-wheel applied upon the end of a shaft, and rotating in fixed bearings, and a hammer-wheel on a shaft having vertically-movable bearings, of a lever, a pressure-link pivoted to one of said movable bearings, and said lever and a treadle for applying the pressure, substantially as specified.

4. The combination, with the overhanging guide-arm, of the shaft, loosely applied in its bearings at one end, and suspended in a vertically-movable sash at the other, a pressure-link, an angle-lever, and an actuating treadle, combined and arranged substantially as specified.

5. In a pipe-jointing machine, the combination, with the hammer-wheel B′, its shaft A′, suspended sash E, and overhanging guide-arm, of the pressure-link *f*, angle-lever D, and spring S, substantially as specified.

6. The adjustable transverse clamping-wheel I′, having the tapering or beveled edges *p′* and deep peripheral grooves *p*, adapted to receive the flanges *o* 2, said wheel being attached to, and rotating on, the end of the adjustable-shaft A′, in combination with a transverse anvil-wheel, I, on shaft A, substantially as specified.

In testimony that I claim the foregoing I have hereunto set my hand this 7th day of May, 1877.

CHARLES H. AMANN.

Witnesses:
J. M. TIBBETTS,
J. C. PATRICK.